United States Patent [19]
Johnson

[11] Patent Number: 5,855,242
[45] Date of Patent: Jan. 5, 1999

[54] PREPACKED FLUSH JOINT WELL SCREEN

[75] Inventor: Russell P. Johnson, Minerals Wells, Tex.

[73] Assignee: Ameron International Corporation, Pasadena, Calif.

[21] Appl. No.: 798,072

[22] Filed: Feb. 12, 1997

[51] Int. Cl.$^6$ .................................................. E21B 42/08
[52] U.S. Cl. ............................................. 166/236; 166/51
[58] Field of Search ............................. 166/51, 228, 236, 166/278

[56] References Cited

U.S. PATENT DOCUMENTS

| | | | |
|---|---|---|---|
| 2,905,251 | 9/1959 | Church | 166/228 |
| 3,683,056 | 8/1972 | Brandt et al. | 166/236 |
| 4,487,259 | 12/1984 | McMichael, Jr. | 166/228 |
| 4,526,230 | 7/1985 | Kojicic | 166/236 |
| 4,700,776 | 10/1987 | Petrovic | 166/157 |
| 4,858,691 | 8/1989 | Ilfrey et al. | 166/236 |
| 4,977,958 | 12/1990 | Miller | 166/205 |
| 5,004,049 | 4/1991 | Arterbury | 166/228 |
| 5,293,935 | 3/1994 | Arterbury et al. | 166/228 |
| 5,311,942 | 5/1994 | Nagoaka | 166/232 |
| 5,435,389 | 7/1995 | Shu et al. | 166/276 |
| 5,476,143 | 12/1995 | Sparlin et al. | 166/233 |
| 5,551,513 | 9/1996 | Surles et al. | 166/278 |

*Primary Examiner*—William Neuder
*Attorney, Agent, or Firm*—Christie, Parker & Hale, LLP

[57] ABSTRACT

A pre-packed well screen has concentric inner and outer fiber reinforced composite tubes with a granular filter medium in the annulus between the inner and outer tubes. The walls of the tubes are slotted for passing fluid through the slots and the filter medium. Each end of the inner tube extends beyond the adjacent end of the outer tube and has a male thread. A connection is made to an adjacent well screen or other tube by a female coupling member threaded onto the male thread. An advantage of the design is that the coupling member connected to the inner tube has an outside diameter approximately the same as the outside diameter of the outer tube.

18 Claims, 1 Drawing Sheet

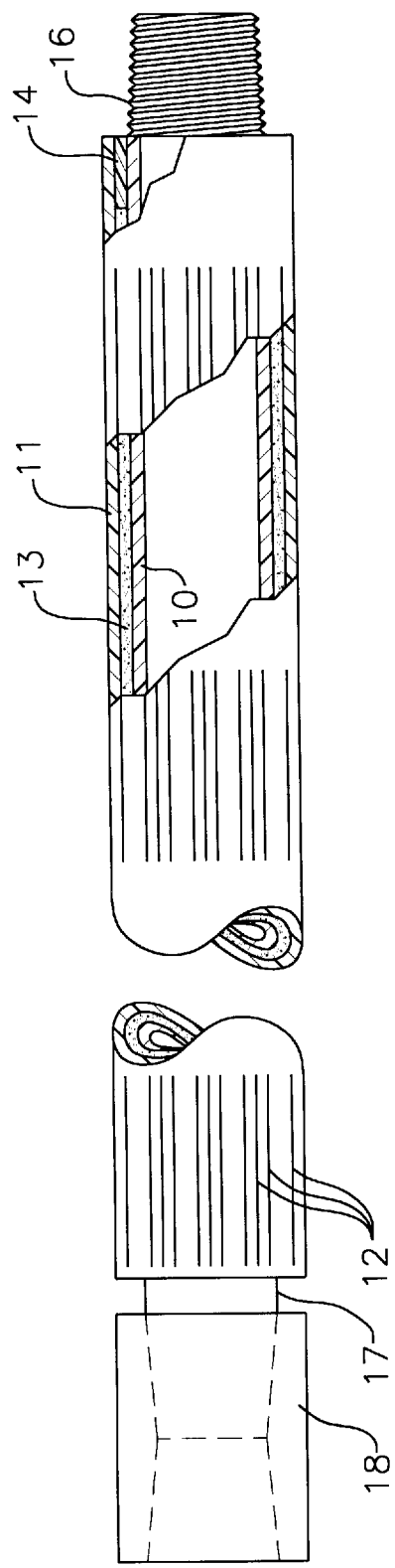

PREPACKED FLUSH JOINT WELL SCREEN

BACKGROUND

This invention concerns a screen used in oil or water wells or the like, to prevent sand or other debris from entering the tubing used for producing oil or water.

Well screens have been used for many years to limit the production of sand and other debris in water, oil and gas wells. Well screens are simply filters that keep sand in the well, eliminating the need to separate the sand from produced fluid at some later stage in the process.

In a typical installation, a casing extends down the borehole of a well and the fluid produced is pumped from within that casing. In many wells a perforated casing may be used for recovering the fluid. In some places, there are loose particles of formation (commonly referred to as "sand", even though not technically sand) which may be entrained in the fluid. It is quite desirable to prevent such sand from entering the production tubing. Thus, a sand filter or well screen is attached at the bottom of the tubing. Such a well screen may extend many feet through a producing formation.

Some well screens are of a rather simple design: a piece of steel pipe with small openings slotted or drilled through the pipe wall. The openings machined in the pipe wall are either smaller than the sand particles in the well, or sand of a grain size larger than the openings is packed around the well screen in the borehole to serve as a filter. This "gravel pack" around the well screen filters out smaller sand particles. Other screens are more complex, using a filter medium such as porous metal, controlled grain size sand, or a fine screen to filter out the sand.

There have recently been developed fiberglass well screens that are pre-packed with sand. An exemplary pre-packed fiberglass well screen comprises inner and outer fiber reinforced epoxy tubes. The annular space between the tubes is filled with a controlled grain size sand to act as a filter medium. The inner and outer tubes are slotted with a slot width narrower than the grain size of the sand packed into the annulus.

Conventional well screens are assembled end to end with couplings to obtain a desired total length of screen in the well. These pipe couplings have a larger diameter than the well screen. It is desirable to have a well screen with a large diameter since this increases the screen area, which not only enhances flow rate through the screen, but also can prolong the screen lifetime before the filter gets plugged. A problem with prior couplings has been that the screens fitted into a well bore must be appreciably smaller than the well bore, so that the couplings can fit into the well. Thus, for example, in a 4" (100 mm) borehole, the well screen has couplings nearly the diameter of the borehole and the screen itself has an outside diameter of only about 73 mm. Larger screens cannot be used since the couplings would not fit into the 100 mm borehole.

It is therefore desirable to provide a well screen having an outside diameter approximately the same as the outside diameter of the couplings.

BRIEF SUMMARY OF THE INVENTION

There is, therefore, provided in practice of this invention according to a presently preferred embodiment, a pre-packed well screen having inner and outer concentric tubes with the inner tube extending longitudinally out of at least one end of the outer tube. The annulus between the tubes is closed at each end and filled with a filter medium. The walls of the inner and outer tubes are perforated to permit fluid flow, through the perforations and the filter medium. A male thread is formed on the protruding end of the inner tube for receiving a female coupling member having an outside diameter approximately the same as the outside diameter of the outer tube.

DRAWING

These and other features and advantages of the present invention will be better understood by reference to the accompanying drawing which illustrates a pre-packed well screen assembly partially in longitudinal cross section.

DETAILED DESCRIPTION

The pre-packed well screen comprises an inner tube 10 concentric with an outer tube 11. The inner and outer tubes are each made of glass fiber reinforced epoxy, polyester, phenolic or phenolic-siloxane resin. In a typical embodiment for use in a 4 inch (100 mm) well bore, the outside diameter of the outer tube is about 95 mm and its inside diameter is about 85 mm. Thus, the wall thickness of the outer tube is about 5 mm. The inner tube in such an embodiment has an outside diameter of about 74 mm and an inside diameter of about 63 mm. The wall thickness of the inner tube is about 5.7 mm The annulus between the inner and outer tubes is about 5.3 mm wide.

Each of the inner and outer tubes has a plurality of longitudinally extending slots 12 extending through the wall of the tube. In an exemplary embodiment, the slots are about 0.25 mm wide and 75 mm long. Such slots are formed by sawing with a thin circular diamond saw. The slots are sawed before the tubes are assembled to each other. In the illustrated embodiment, groups of three slots are closer together, with a somewhat wider space between groups. Six to eight such groups are provided around the circumference of the tubes. A half dozen or so bands of slots are provided along the length of one section of well screen. Other slot arrangements may be used.

The annulus between the two pipes is filled with silica sand 13. The sand is preferably a uniform grain size which passes through a 20 mesh screen and is retained on a 40 mesh screen. That is, the grain size of the sand is in the range of from about 0.37 to 0.76 mm. Sand can be placed in the annulus by standing the tubes vertically, vibrating them and pouring sand into the annulus. The tubes are maintained coaxial during filling to obtain a uniform thickness of the granular filter medium.

Other filter media may also be used in the annulus between the inner and outer tubes. For example, a layer of glass fiber mat may be wrapped around the inner tube before insertion through the outer tube. Similarly, a sheet of porous metal may be placed in the annulus. A granular filter medium is desirable since it can be readily placed in the annulus after the tubes are assembled, and sand is quite inexpensive.

The outer tube is shorter than the inner tube so that each end of the inner tube protrudes beyond the end of the outer tube. A ring shaped spacer or "bulkhead" 14 is cemented in place between the inner and outer tubes adjacent to each end. One of the bulkheads is cemented in place before the granular filter medium is added. After filling the annulus with sand, the second bulkhead is cemented in place.

A male thread 16 is formed on the protruding end or "pin" of the inner tube at each end of the assembly of tubes. An exemplary thread has an 8-round thread-form having a pitch of about 3 to 6 mm, and a thread depth of about 2 mm.

Preferably the thread is tapered at about 1° to form a locking thread. The threaded pin extends 60 to 70 mm beyond the outer tube at one end of the assembly. A similar pin length is used at the other end and there is a short cylindrical extension 17 of the inner tube beyond the end of the outer tube before the thread commences. Although a shallow a 8-round thread is employed in the illustrated embodiment, other thread forms and dimensions may also be used.

A coupling member 18 having a female thread is threaded onto the male pin end of the inner tube. Such a coupling member is illustrated at one end of the well screen assembly in the drawing. An assembly of well screen and coupling typically has a length of about 3.7 meters, or about half the length of typical production tubing. The couplings are employed for assembling a plurality of well screens end to end for a desired length in the well bore. At the bottom of the string of well screens, a blank coupling member may be used as a cap to close the end of the well screen. At the upper end of a string of well screens, a coupling member may have a thread at one end to engage the thread end of the inner tube, and on its other end a standard API thread for assembly onto the production tubing extending from the filter to the ground surface.

When the coupling is threaded onto a male pin at the end of the well screen having a cylindrical extension 17 between the thread and the end of the outer tube, the coupling locks against the tapered thread before reaching the end of the outer tube, thereby leaving a gap having a smaller diameter than the coupling and outer tube. This gap may be used to receive a C-shaped Plato employed at the wellhead to support the well screens during assembly and installation of several lengths of well screen.

The coupling member has an outside diameter approximately the same as the outside diameter of the outer tube and certainly not significantly larger than the outside diameter of the outer tube. For example, in the exemplary embodiment described and illustrated, the coupling has an outside diameter of about 95 mm to fit into a 100 mm well bore. Since the outside diameter of the outer tube is approximately the same as the diameter of the coupling, the screen area of the well screen is significantly increased, as compared with prior fiber reinforced composite well screens with couplings on the outer tube. For example, in a well screen for a 100 mm well bore, a prior well screen would have an outside diameter of about 73 mm. Such a well screen has a screen surface area of about 0.73 $m^2$ per meter of length of the screen. A well screen where the outside diameter of the outer tube is about the same as the diameter of the coupling (for a 100 mm well) has a screen surface area of about 0.98 $m^2$ per meter of length of the screen. This is about a 35% increase in screen surface area, which translates directly into greater production and a longer screen life before the screen is plugged. Furthermore, there is less pressure drop within the inner tube since its diameter is more than 25% larger than the prior screen.

Another advantage of the fiber-reinforced composite well screen is that it is easily drilled from the well. There may be occasions when a well screen becomes separated from the production tubing and is lost in the bottom of a well. For example, at the top of a string of well screens one may install a fiber reinforced epoxy sub having a reduced cross section region that will fail at a predetermined tensile load. The well screens below this deliberately weakened section may become stuck in the well bore as sand particles build up in the bore around the screens. In some wells it may be desirable to add a "gravel pack" around a well screen as described above for prefiltering fluid before it reaches the slits in the screen. The use of a gravel pack almost insures that the well screen will be stuck in the hole. In that case, the production tubing may be pulled and the string broken at the weak link, leaving the well screens in the hole. The glass fiber reinforced epoxy well screens are readily milled from a light drilling rig or workover rig to remove the lost screens from the well bore. A steel screen is much harder to fish or mill.

The pre-packed well screen has been described in an exemplary embodiment for a 100 mm well bore. This is desirable since such small diameter wells are rapidly and economically drilled. One may, therefore, use closer well spacing for enhanced production from low permeability formations. Larger well screens may also be used, such as, for example, about 120 mm diameter for a standard size well bore with a diameter a little over 125 mm.

As mentioned above, such pre-packed well screens may be used for production of water, oil, gas or other fluids. The fiber reinforced composite well screens are desirable in such service because of corrosion resistance. Some well screens are made of costly stainless steel for service in corrosive environments. Fiber reinforced composite well screens are considerably less costly than steel screens and even more economical as compared with stainless steel screens.

Another distinct advantage of a fiber reinforced composite well screen is the ability to make relatively sharp turns in a well bore. Recent years have seen an upsurge of more or less horizontal drilling. Such a well is drilled vertically to a desired level of the formation and then the well bore gradually turns to drill at an angle. The well screens placed in such a well bore must bend to pass through the underground turns of the borehole. It has been shown that fiber reinforced composite well screens can turn through much tighter radius turns than can steel well screens without buckling or collapsing.

Although the pre-packed well screen has been described with a male thread at each end and a separate coupling, it will be apparent that a well screen could also be made with a male thread on the inner tube at one end and a female thread in an extended bulkhead in the outer tube at the opposite end. In such an embodiment, the end of an adjacent well screen could be considered as the female coupling member. An arrangement as illustrated is preferred, since the inner tube with the male thread at each end forms a tension member supporting the well screens in the well bore, without any need for appreciable shear transfer of load between the inner tube and an end spacer or bulkhead.

In the preferred arrangement, the ends of the inner tube extending beyond the end of the outer tube are threaded for receiving a threaded female coupling member. It is also possible to adhesively bond an exterior surface of the inner tube to the inside of an outer tube or bulkhead on an adjacent well screen or connector sub. The time to make up such joints at the wellhead may be excessive.

What is claimed is:

1. A prepacked well screen comprising:
   an outer fiber reinforced composite tube;
   an inner fiber reinforced composite tube concentric with the outer tube and having at least one end extending beyond an end of the outer tube;
   a filter medium in an annulus between the tubes;
   a plurality of perforations through the walls of the inner and outer tubes for passing fluid through the tubes and the filter medium;
   a male thread formed on at least the extending end of the inner tube; and a female coupling member connected to the male thread having an outside diameter not significantly larger than the outside diameter of the outer tube.

2. A well screen according to claim 1 wherein each tube comprises glass fiber reinforced resin selected from the group consisting of epoxy, polyester, phenolic and phenolic-siloxane.

3. A well screen according to claim 1 wherein each tube comprises glass fiber reinforced epoxy resin.

4. A well screen according to claim 1 wherein the filter medium comprises a granular material filling the annulus.

5. A well screen according to claim 1 wherein the filter medium comprises grains of sand in the annulus.

6. A well screen according to claim 5 wherein each of the inner and outer tubes comprises a plurality of longitudinal slots having a width narrower than the size of the grains of sand.

7. A well screen according to claim 1 having both ends of the inner tube extending beyond the respective ends of the outer tube and having a male thread on each of the extending ends.

8. A well screen according to claim 7 further comprising an extension of the inner tube between the beginning of the thread on one extending end and the adjacent end of the outer tube, thereby forming a gap between the coupling member and the end of the outer tube.

9. A prepacked well screen comprising:

inner and outer concentric glass fiber reinforced composite tubes, the inner tube extending longitudinally out of at least one end of the outer tube;

means for closing an annulus between the inner and outer tubes adjacent to each end;

a filter medium in the annulus between the inner and outer tubes;

a plurality of slots through the walls of the inner and outer tubes for passing fluid through the slots and the filter medium;

a male thread on the end of the inner tube that extends out of the outer tube; and a female coupling member threaded onto the male thread, the coupling member having an outside diameter approximately the same as the outside diameter of the outer tube.

10. A well screen according to claim 9 wherein both ends of the inner tube extend beyond the respective ends of the outer tube and having a male thread on each of the extending ends.

11. A well screen according to claim 10 further comprising an extension of the inner tube between the beginning of the thread on one extending end and the adjacent end of the outer tube for forming a gap between the coupling member and the end of the outer tube.

12. A well screen according to claim 10 wherein each tube comprises glass fiber reinforced resin selected from the group consisting of epoxy, polyester, phenolic and phenolic-siloxane.

13. A well screen according to claim 12 wherein each tube comprises glass fiber reinforced epoxy resin.

14. A well screen according to claim 9 wherein the filter medium comprises a granular material filling the annulus.

15. A well screen according to claim 14 wherein the size of the grains of filter material are larger than the slots in the tubes.

16. A well screen according to claim 9 wherein the filter medium comprises grains of sand in the annulus.

17. The prepacked well screen as recited in claim 1 wherein the coupling member has an outside diameter approximately the same as the outside diameter of the outer tube.

18. A prepacked well screen comprising:

inner and outer concentric glass fiber reinforced composite tubes, the inner tube extending longitudinally out of at least one end of the outer tube;

means for closing an annulus between the inner and outer tubes adjacent to each end;

a sand filter medium in the annulus between the inner and outer tubes;

a plurality of slots through the walls of the inner and outer tubes for passing fluid through the slots and the filter medium, the slots extending longitudinally along each inner and outer tube;

a male thread on the end of the inner tube that extends out of the outer tube; and a female coupling member threaded onto the male thread, the coupling member having an outside diameter approximately the same as the outside diameter of the outer tube.

* * * * *